United States Patent [19]

Buell

[11] Patent Number: 5,435,584
[45] Date of Patent: Jul. 25, 1995

[54] CYCLE REAR SUSPENSION WITH SHOCK ABSORBER BUILT INTO FRAME LUG

[75] Inventor: Erik F. Buell, Mukwonago, Wis.

[73] Assignee: Buell Motor Company, Inc., East Troy, Wis.

[21] Appl. No.: 210,259

[22] Filed: Mar. 17, 1994

Related U.S. Application Data

[63] Continuation of Ser. No. 895,674, Jun. 9, 1992, abandoned.

[51] Int. Cl.6 ............................................. B62K 25/28
[52] U.S. Cl. .................................. 280/284; 280/281.1;
280/285; 188/317
[58] Field of Search ............... 280/275, 283, 284, 285,
280/286, 288, 281.1; 180/227; 267/226, 118,
124; 188/313, 316, 317

[56] References Cited

U.S. PATENT DOCUMENTS

| 450,705 | 4/1891 | Surbridge | 280/284 |
|---|---|---|---|
| 1,068,583 | 7/1913 | Harley | 280/284 |
| 2,823,915 | 2/1958 | Bourcier de Carbon | 188/317 |
| 3,877,539 | 4/1975 | Tilkins | 180/227 |
| 4,582,343 | 4/1986 | Waugh | 180/227 |

FOREIGN PATENT DOCUMENTS

| 0552237 | 11/1956 | Belgium | 180/227 |
|---|---|---|---|
| 0358834 | 5/1938 | Italy | 280/284 |
| 0411696 | 5/1945 | Italy | 280/284 |
| 0482499 | 6/1953 | Italy | 280/284 |

OTHER PUBLICATIONS

"Bouncing Babies, a Familial Guide to the New Suspension Systems", OUtside Magazine, Mar. 1992, p. 72.
"Offroad Pro-Flex 352", Outside Magazine, Mar. 1992, p. 89.

Primary Examiner—Margaret A. Focarino
Assistant Examiner—Anne Marie Boehler
Attorney, Agent, or Firm—Ryan, Kees & Hohenfeldt

[57] ABSTRACT

A frame having rear suspension system for a two-wheel cycle such as a bicycle or motorbike. The suspension system includes a tubular shock absorber whose outer tubular housing is integrated into a cast or machined lower lug. Several of the main frame tubes and the pedal shaft bearings are also mounted to this lug. By integrating the outer tube of the shock absorber into the tube junction lug, a substantial savings in weight and components is obtained in the chassis assembly while still providing a suspension system.

12 Claims, 7 Drawing Sheets

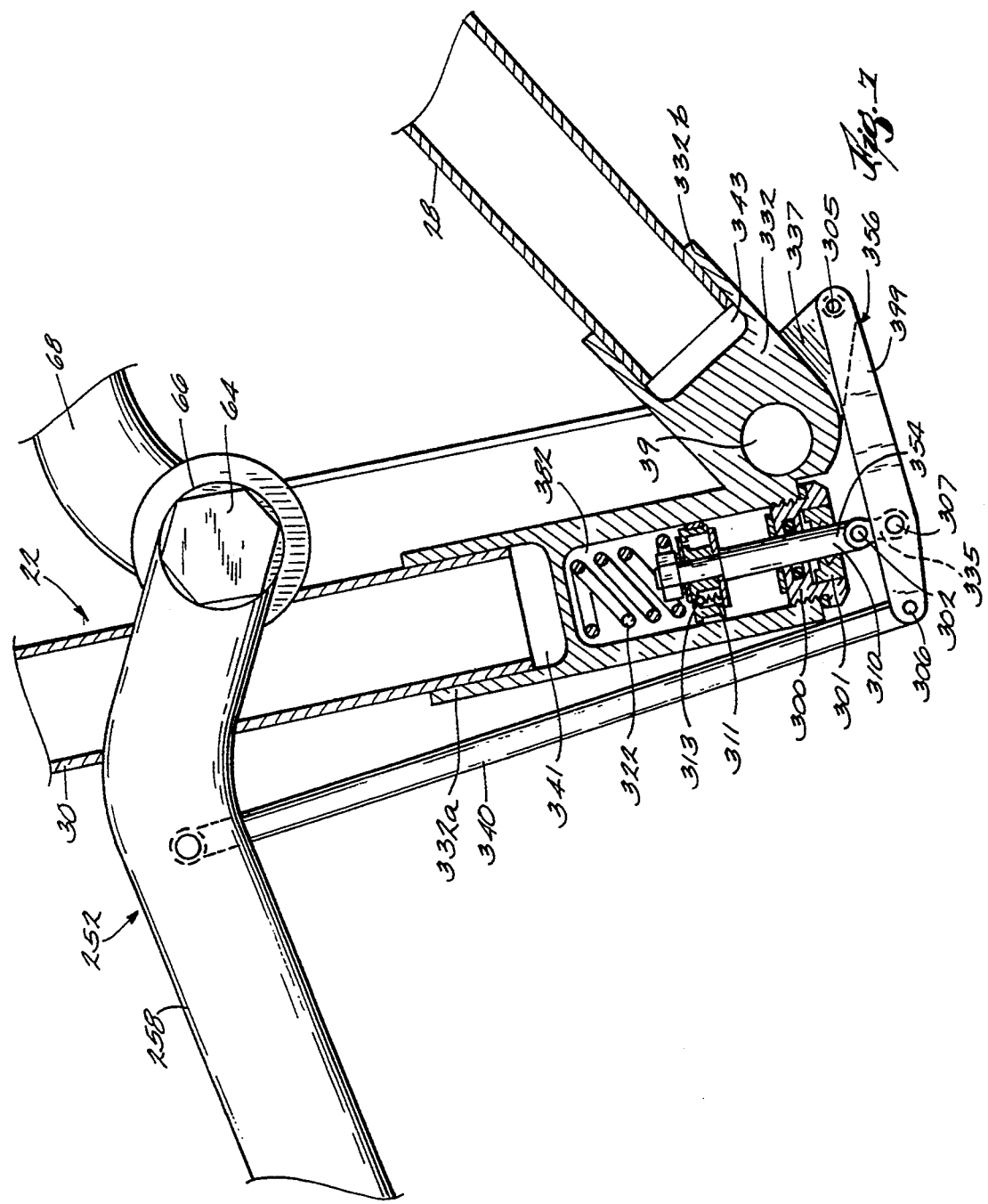

5,435,584

CYCLE REAR SUSPENSION WITH SHOCK ABSORBER BUILT INTO FRAME LUG

This is a continuation of copending application Ser. No. 07/895,674, filed on Jun. 9, 1992, now abandoned.

BACKGROUND OF THE INVENTION

This invention relates to vehicle suspension systems, and particularly to suspensions for two-wheeled vehicles including bicycles and motorcycles.

Bicycles and motorcycles were originally built with rigid frames. As the horsepower, weight and speed of motorcycles increased, both front and rear wheel suspensions were developed for them. These motorcycle suspension systems have now reached very high levels of function and sophistication, but in many cases have become extremely complex, expensive and heavy, with many linkages, mounts, bearings, and so on.

Recently, use of off-road bicycles has tremendously expanded, likewise stimulating the development of many front and rear suspensions. To date, most of these new bicycle suspensions have been closely fashioned after motorcycle-style systems. The specific needs of bicycles are different, however. One paramount difference is the necessity for the suspension system to be as light as possible. Because of the speeds at which motorcycles are driven and the power of their engines, the mass of the various components is in a different realm than that of the bicycle. The very best rigid bicycle frames currently available weigh under 3 pounds, which is less than most motorcycle shock absorbers weigh by themselves. Therefore, adding a shock absorber, plus mounting brackets and hardware, becomes a very significant problem on a bicycle.

This invention relates to improvements to the structure set forth above, and to solutions to some of the problems raised or not solved thereby.

SUMMARY OF THE INVENTION

The invention is an improved rear wheel suspension system, especially beneficial on mountain bikes and street bicycles, but also useful on two wheeled cycles generally, including motorbikes, motorscooters, and motorcycles. The system reduces the weight and component count of the rear suspension, with benefits in the areas of performance, cost, and ease of manufacturing and assembly.

According to the invention the suspension system has a pivot point about a shaft mounted on the main frame. This shaft is parallel to the wheel axles. The rear suspension swingarm assembly rotates about this pivot point to allow motion of the rear wheel relative to the main frame as the wheel encounters obstacles. Attached to this swingarm assembly via linkage or flexible means is a rod which has a piston at the opposite end. The rod passes through a sealed cap which fastens to the end of a tubular cavity. This cavity is part of a junction lug where the downtube, the seat post and the pedal bearing shell are all attached together by welding, brazing, or bonding means.

The piston is thus positioned inside the cavity. The cavity hence acts as a cylinder for hydraulic and/or pneumatic action of the piston. As the rear wheel rises and falls over surface irregularities, the piston moves back and forth within the cylindrical cavity, forcing the fluid and gas medium within the cylinder to flow through valves in the piston, thus providing damping force. The piston rod may also activate a coil spring fitted in the cavity. Moreover, pneumatic pressure may be added to the cavity, where it would function as an air spring by its pressure acting on the piston rod area.

Thus, complete damping and even springing means for a rear suspension may be provided, with potentially only a piston, piston rod, seal, and fluid being added to the component count.

Further objects and advantages of the invention will become apparent hereinafter.

BRIEF DESCRIPTION OF THE DRAWINGS

FIG. 7 is a side elevational view of the embodiment shown in FIG. 6, showing the rear suspension in a loaded, impact absorbing position.

DESCRIPTION OF THE PREFERRED EMBODIMENT

Figure 1:
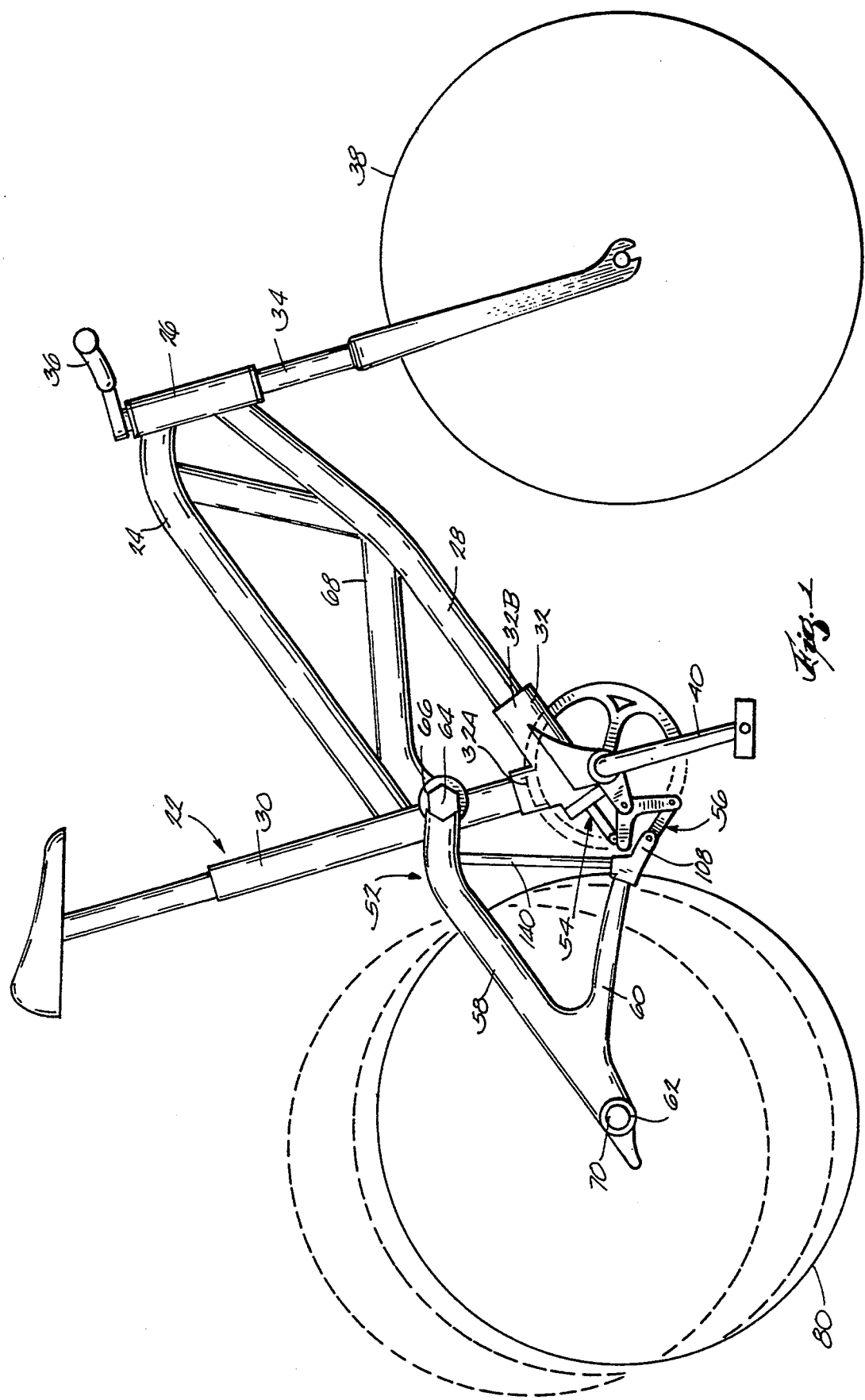
FIG. 1 is a right side elevational view of a bicycle incorporating a rear suspension system constructed according to a preferred embodiment of the present invention, shown in a substantially unloaded position.

Referring now in more detail to the embodiment shown in FIGS. 1 through 4, a bicycle 20 includes a main frame 22, which includes a top tube 24. Top tube 24 may be inclined as shown there but is not required by the invention to be inclined at any particular angle. The main frame 22 also includes a head tube 26 connected to the front end of top tube 24, a downtube 28 connected to the head tube beneath the top tube and running rearward and downward, and a seat tube 30 running from the rear end of downtube 28, quite vertically upward, and somewhat rearward, past the rear end of top tube 24. The bottom end of seat tube 30 and the rear end of downtube 28 are connected together in a V-shape at a bottom bracket lug 32, the seat tube connecting to a rearward leg 32A of the lug and the downtube connecting to a forward leg 32B of the lug. Fitted to the main frame 22 are suitable front end components including a front fork 34 and a handlebar 36 connected to head tube 26, and a front wheel 38 connected to front fork 34. These front end components may be conventional and form no part of this invention. A pedal and front sprocket assembly 40 is mounted for rotation within bottom bracket lug 32.

According to the invention, the bicycle 20 is provided with a rear suspension system 50, which includes a pivotable rear frame assembly 52, a shock absorber means 54, and connecting and guiding means 56.

Figure 2:
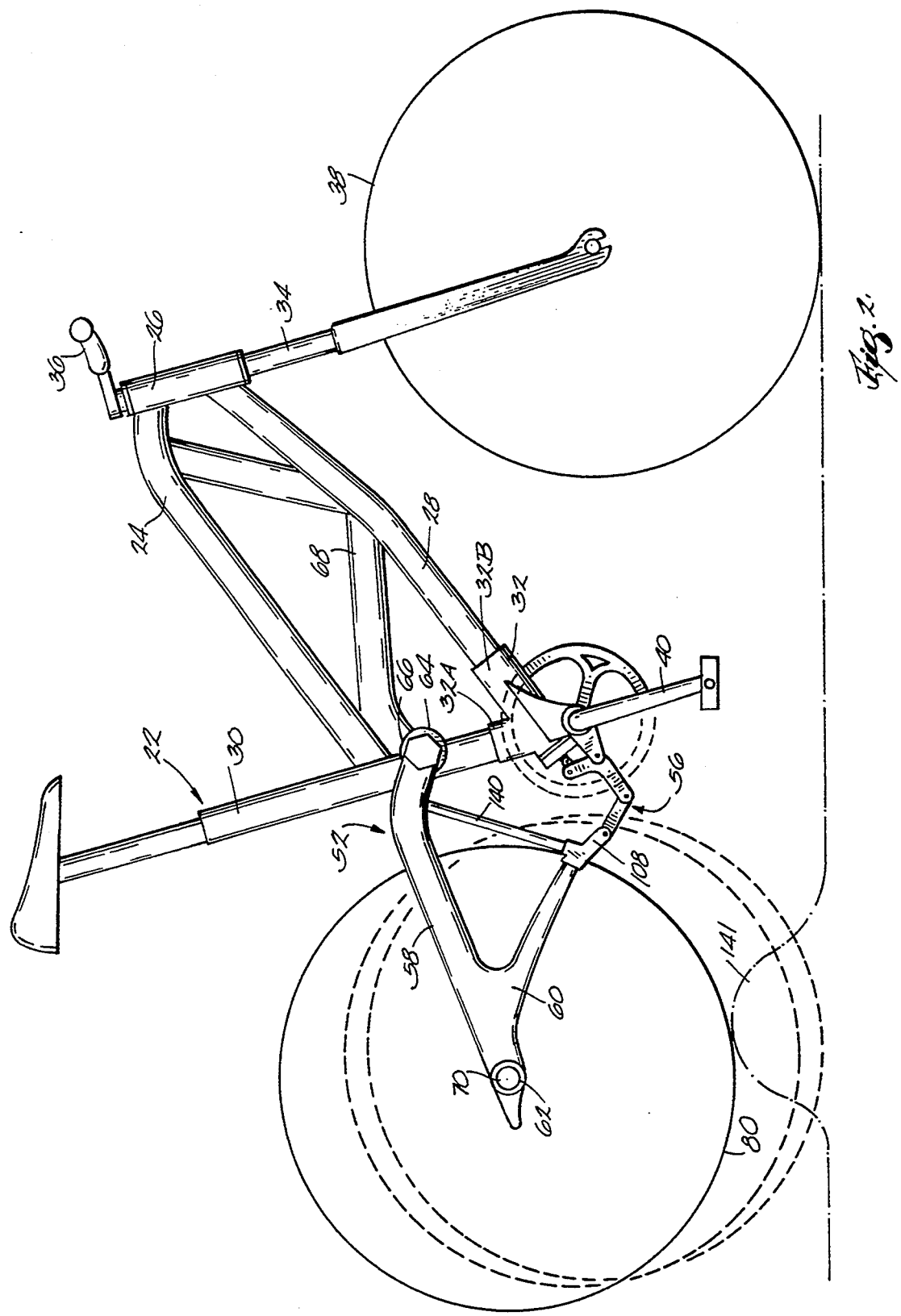
FIG. 2 is a side elevational view similar to FIG. 1, showing the rear suspension in a loaded, impact-absorbing position.
Figure 3:
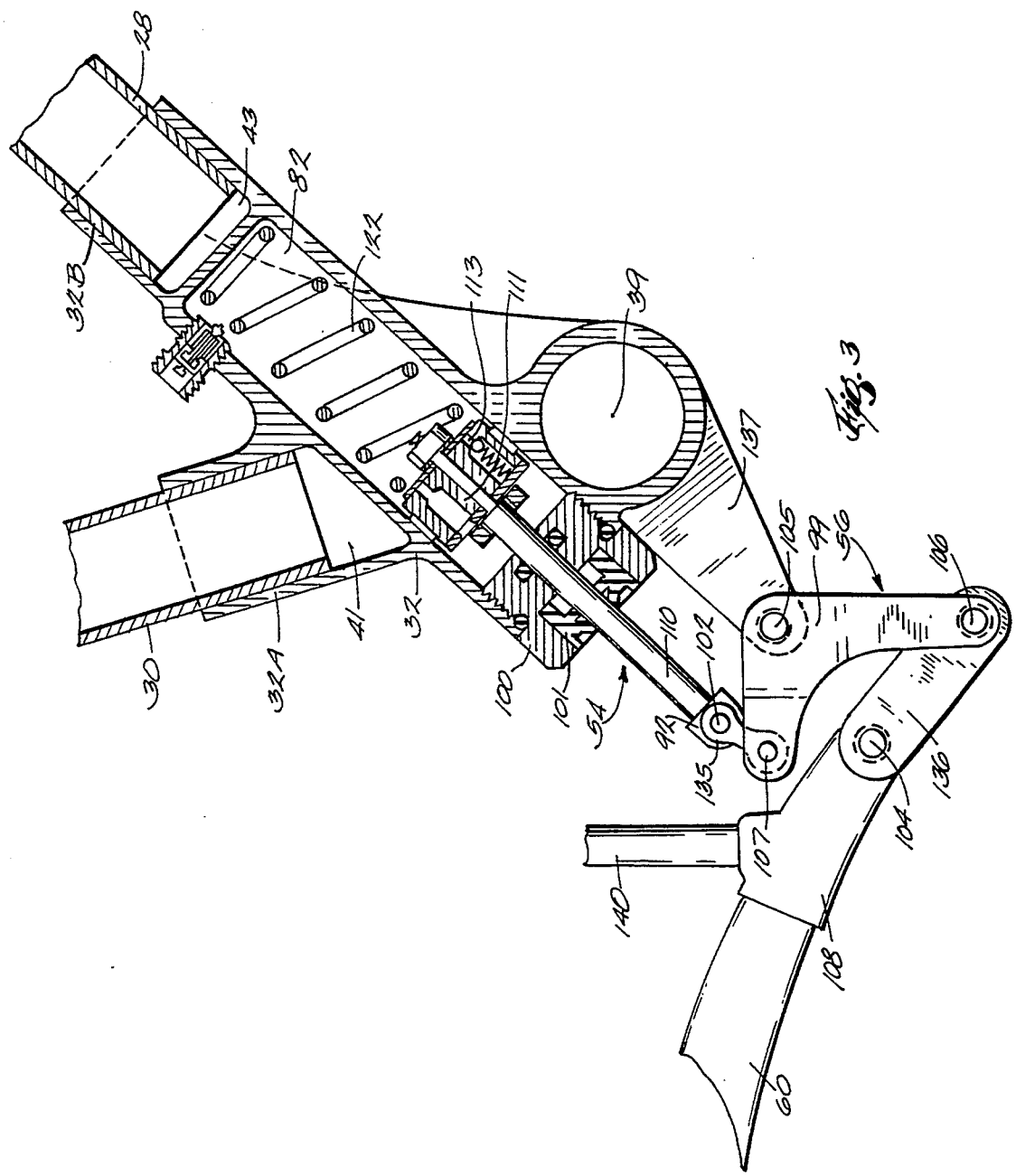
FIG. 3 is a fragmentary enlarged view, shown partially in cross section, of the lower lug shown in FIGS. 1 and 2.

In the embodiment shown in FIGS. 1, 2 and 3, the rear frame assembly 52 includes a primary swingarm 58 and a secondary swingarm 60. Primary swingarm 58 is pivotably connected at its front end to main frame 22. Swingarm 58 is swingable in an arc about a pivot pin 64 extending through a bearing housing 66 which is affixed to a point on the seat tube 30 partway up from where the seat tube is received in bottom bracket lug 32. From that pivot pin 64, primary swingarm 58 extends rearward and downward, terminating in a rear fitment 62, for mounting a rear axle 70 of a rear wheel 80. Secondary swingarm 60 extends forward from fitment 62 in a substantially level attitude, thus forming a V with primary swingarm 58.

In order to provide substantial strength in the frame, and particularly the mounting of the pivot pin 64, a triangulating reinforcement tube 68 may be secured as by welding to the seat tube 30 where the pivot pin 64 is positioned, and to the downtube 28 a substantial distance up from the bottom bracket lug 32.

According to the embodiment of the invention shown in FIGS. 1 through 3, shock absorber means 54 is mounted concentrically into a tubular cavity forming a cylinder 82 in the forward leg of bottom bracket lug 32. Bottom bracket lug 32 has formed therein a bearing housing 39 for the axis bearings of the pedal-and-front-sprocket assembly 40, positioned just above the opening to cylinder 82. Bottom bracket lug 32 also includes a cavity 41 in the rear leg 32A into which the seat tube 30 is inserted and attached as by bonding or welding, and a cavity 43 in the forward leg 32B into which the downtube 28 is inserted and attached as by bonding or welding. In the embodiment shown best in FIG. 3, bottom bracket lug 32 includes tubular cavity 82 in the forward leg 32B, which is closed on its upper end, and has attachment means at its lower end for a lower cap 100.

The lower cap 100 closes and seals the bottom end of cylinder 82. The cylinder is provided with a fluid medium, which may be hydraulic or gas or a combination thereof. A piston 111 is positioned within cylinder 82, and is provided with dampening apertures 113 to regulate the flow of the fluid medium through the piston in a manner similar to conventional shock absorbers currently used on motorcycles and automobiles. Piston 111 is connected to a piston rod 110, which passes through a seal 101 in lower cap 100, and is threadedly secured in a lower mount 92. Lower mount 92 is attached to connecting and guiding means 56 by a transverse pin 102.

A main spring 122 is provided to support the weight of the load, and to provide flexibility in the suspension. In the embodiment shown in FIG. 3, main spring 122 is located inside cylinder 82, positioned to be compressed between the piston 111 and the upper closed end of the cavity of the cylinder. A pressure valve 115 may be attached to the upper end of the lug 32, such that gas pressure may be added to the cylinder 82 to act as additional springing means.

As stated, in this embodiment pivotable rear frame assembly 52 includes secondary swingarm 60. This swingarm 60 is formed of a tube or beam, secured at its rearward end as by welding, solder, or other suitable joining means to the rear fitment 62 at the end of the rear axle 70. There is a predetermined, fixed angle F between the primary swingarm 58 and the secondary swingarm 60.

As best shown in FIGS. 1 and 2, the forward end of secondary swingarm 60 is connected as by welding, solder, or other joining means at a junction 108 to a substantially vertical cross tube 140 which connects on its other end as by welding, solder, or other suitable joining means to the front section of the primary swingarm 58.

Referring again to FIG. 3, connecting and guiding means 56 includes a link 136 pivotably connected at one end to junction 108 via a pivot pin 104, and pivotably connected at the other end to a rocker arm 99 via another pivot pin 106. Rocker arm 99 is pivotably attached to the main frame 22 via a pivot pin 105 which passes through an ear 137 provided for that purpose and attached to or integrally formed with bottom bracket lug 32. Rocker arm 99 thus has three pivot points, one for pivot pin 106, one for pivot pin 105, and one that attaches to a link 135 with a pivot pin 107. The opposite end of link 135 is connected to the lower shock absorber mount 92 with a pivot pin 102.

Thus, as can be seen by comparing FIGS. 1 and 2, when the rear wheel 80 is forced to move upwardly such as by a bump 141, rear frame assembly 52 is forced to rotate about pivot pin 64, in turn rotating junction 108 generally upward. By means of link 136, rocker arm 99 is rotated clockwise, forcing piston rod 110 and piston 111 further into cylinder 82, against the force of the fluid flowing through dampening apertures 113. As the bump 141 is passed, the above process is reversed.

Figure 4:
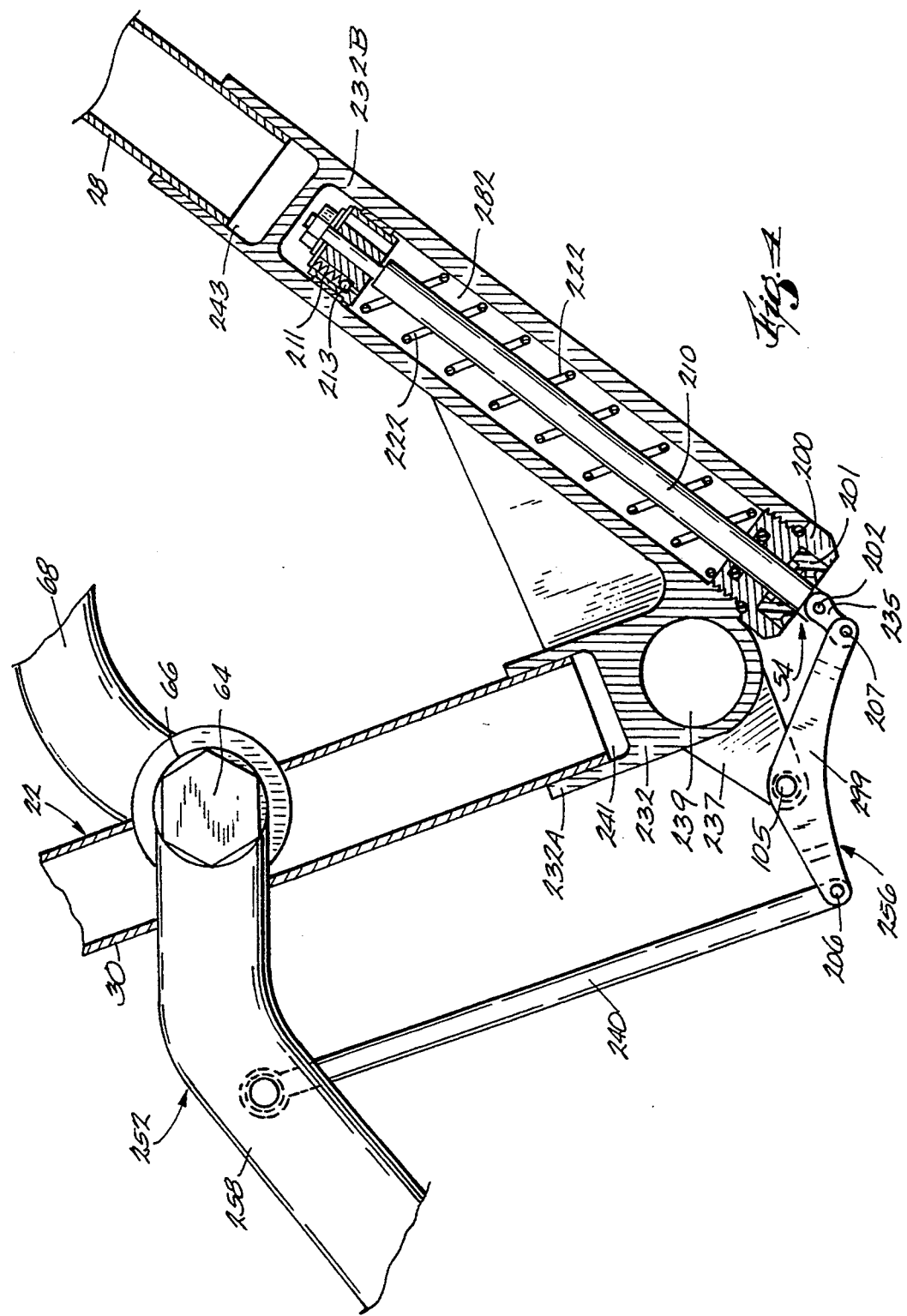
FIG. 4 is a fragmentary view similar to FIG. 3 showing a suspension system constructed according to an alternative embodiment of the invention, shown in an unloaded and uncompressed position.

FIG. 4 shows a rear suspension system constructed according to an alternative embodiment of the invention. As shown there, that embodiment provides that the rear frame assembly 252 has only a single swingarm 258, and no part corresponding to the secondary swingarm 60 of the embodiment shown in FIGS. 1, 2 and 3. As with bottom bracket lug 32 shown in FIGS. 1 through 3, in this embodiment a bottom bracket lug 232 provides a bearing housing 239 for the pedal-and-front-sprocket assembly 40 (FIGS. 1 and 2), a cavity 241 in its rear leg 232A for accepting seat tube 30, and a cavity 243 in its forward leg 232B for accepting downtube 28.

In this embodiment, though, a cross link 240 is pivotably attached at its top end to swingarm 258 a short distance from pivot pin 64 in seat tube 30. The bottom end of cross link 240 is connected to connecting and guiding means 256, and in particular is pivotably connected to a rocker arm 299 via a pivot pin 206. Rocker arm 299 is in turn pivotably connected about at its center to an ear 237 provided for that purpose and attached to or integrally formed with bottom bracket lug 232. The end of rocker arm 299 opposite that connected to cross link 240 is pivotably connected to a shock absorber means 254, and in particular to a piston rod 210 by means of an intermediate link 235. One end of link 235 is connected to rocker arm 299 by means of a pivot pin 207, while the opposite end of link 235 is connected to piston rod 210 via a pivot pin 202. Besides piston rod 210, shock absorber means 254 is formed by a cylinder 282 formed in a cavity within the forward leg 232B of bottom bracket lug 232, and a piston 211 affixed to the end of the piston rod 210. In this embodiment the opening to cylinder 282 is positioned beneath bearing housing 239 for the axis bearings of the pedal-and-front-sprocket assembly 40. The piston rod passes through a seal 201 in a cap 200 attached to the end of cylinder 282, which closes and maintains pressure in the cylinder. A spring 222 is also provided, in this embodiment entrapped between the piston 211 and the cap 200. In this embodiment the dampening apertures 213 are reversed in direction compared to the apertures 113 of the embodiment shown in FIGS. 1 through 3.

Figure 5:
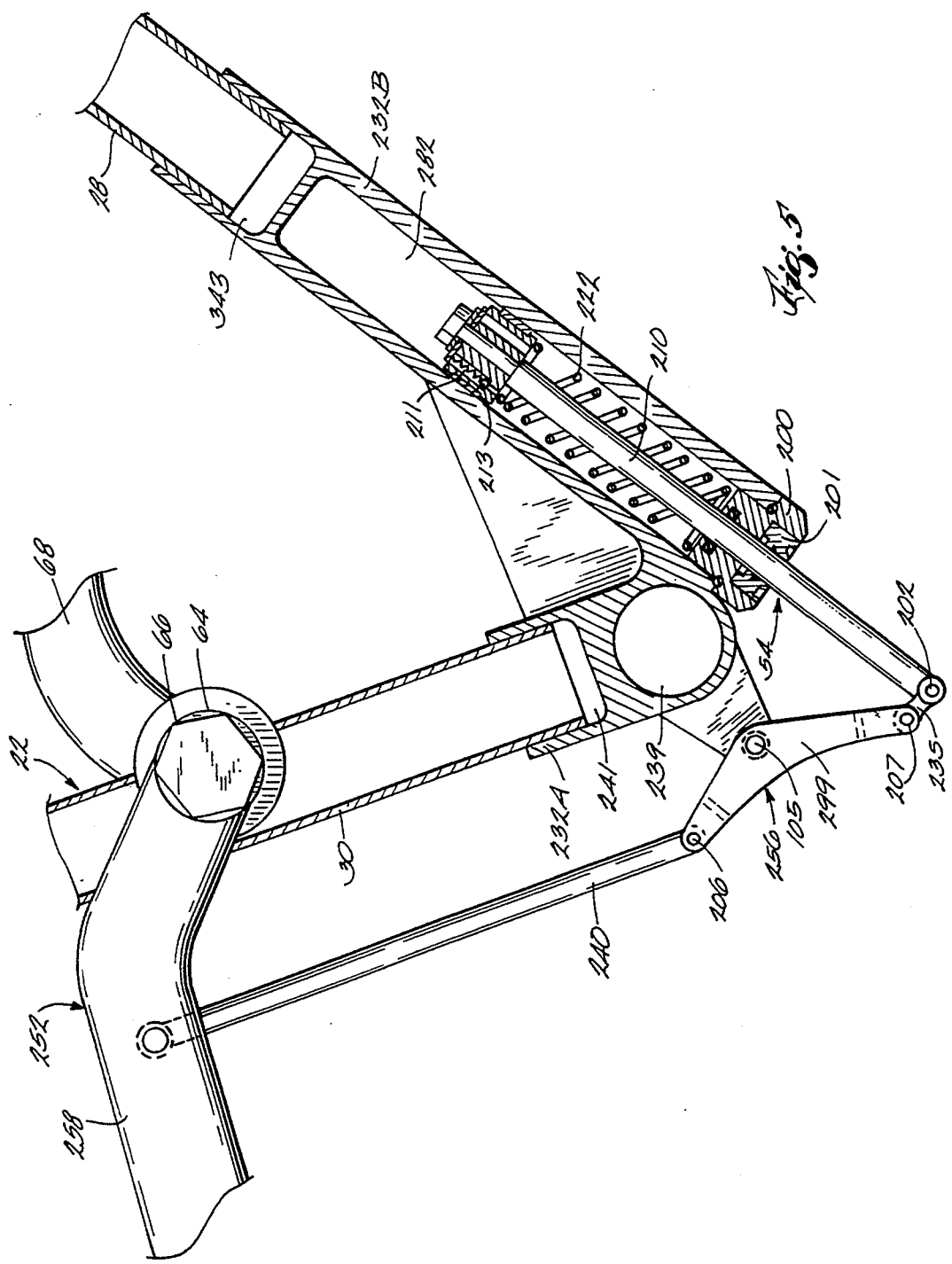
FIG. 5 is a side elevational view of the embodiment shown in FIG. 4, showing the rear suspension in a loaded, impact absorbing position.

In operation, then, as the wheel 80 hits a bump 141, as shown in FIG. 5, swingarm 258 rotates upward, causing rocker arm 299 to rotate clockwise. This motion extends the piston rod 210 out of cylinder 282 against the force of the spring 222 and the fluid flowing through dampening apertures 213. Again, when the bump 141 is passed, the process is reversed.

Figure 6:
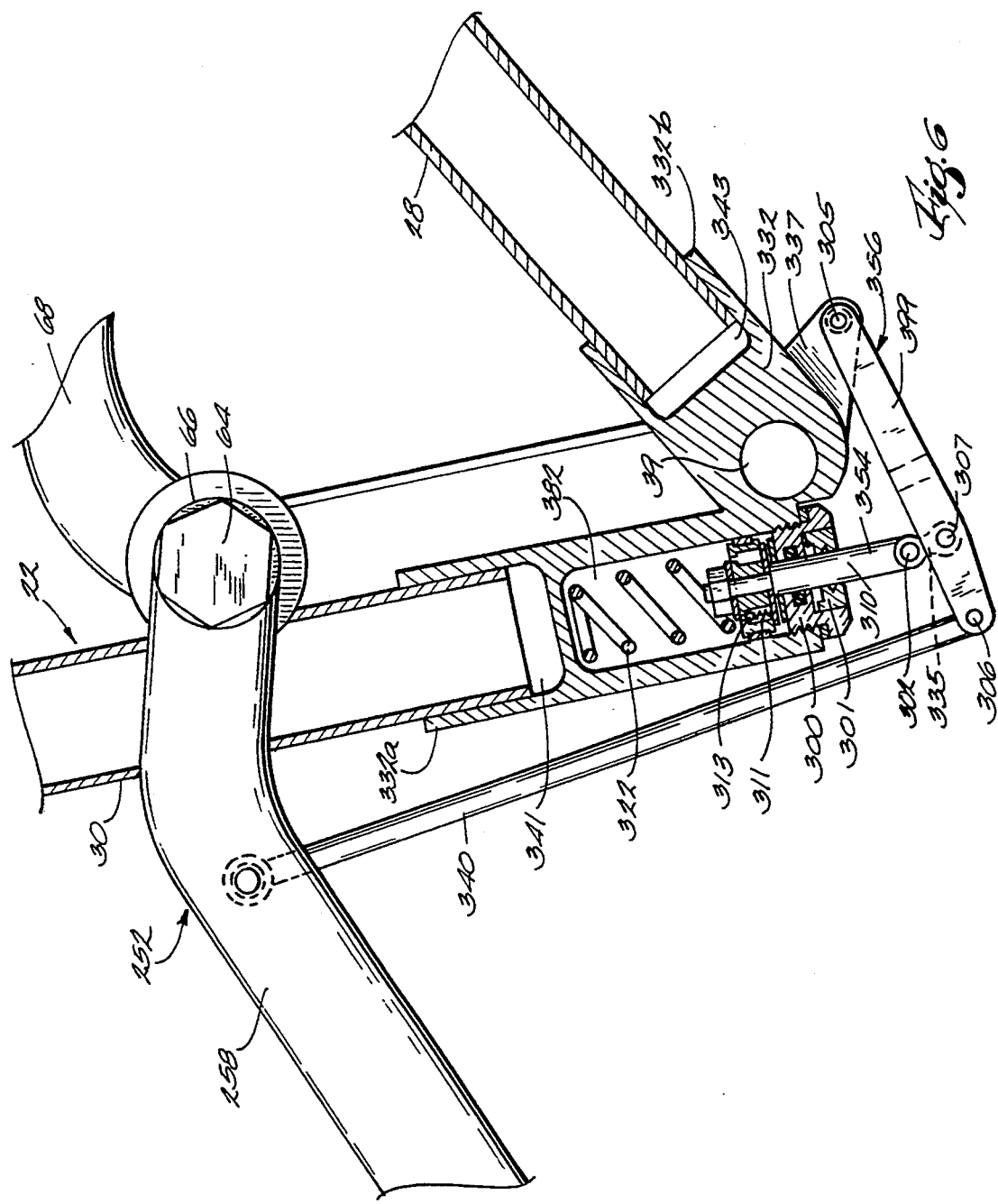
FIG. 6 is a fragmentary view similar to FIG. 3 showing a suspension system constructed according to another alternative embodiment of the invention.

FIG. 6 shows a rear suspension system constructed according to another alternative embodiment of the invention. As shown there, this embodiment provides that the cylinder for the shock absorber means is positioned within the rear leg of the bottom bracket lug, rather that the forward leg as was the case with the embodiments described above.

In particular, this embodiment includes a bottom bracket lug 332 again having a rear leg 332a for accepting seat tube 30 and a forward leg 332b for accepting downtube 28. As stated, the cylinder 382 of the shock absorber means 354 in this embodiment is formed within the rear leg 332a of bottom bracket lug 332. A piston 311 is positioned within cylinder 382 and connected to a piston rod 310 that extends outside of the cylinder. A spring 322 is entrapped for compression between piston 311 and the upper closed end of cylinder 382. Once again piston rod 310 passes through a cap 300 and seal 301 that closes and maintains pressure in cylinder 382. The distal end of piston rod 310 connects to a connecting and guiding means 356, and in particular to one end of a link 335 by means of a pivot pin 307. The opposite end of link 335 is connected to a rocker arm 399 at a point separated from either end of the rocker arm. One end of rocker arm 399 is pivotably anchored to an ear 337 provided for that purpose on lug 332 by a pivot pin 305, while the opposite end of the rocker arm is pivotably attached to a cross link 340 by a pivot pin 306. The opposite end of cross link 340 is connected to the rear frame assembly 252, the same rear frame assembly as described with reference to FIG. 4, which again has only a single swingarm 258.

In operation, then, when a cycle having the suspension system shown in FIG. 6 hits a bump 141 (FIG. 2), rear frame assembly 252 rotates about pivot pin 64 as shown in FIG. 7, pulling on the cross link 340. By means of rocker arm 399, this causes piston rod 310 and piston 311 to move upward into the cylinder against the force of the spring 322 and the fluid flowing through dampening apertures 313. Again, as with the other embodiments, when the bump is passed, the process is reversed.

While the apparatus hereinbefore described is effectively adapted to fulfill the aforesaid objects, it is to be understood that the invention is not intended to be limited to the specific preferred embodiment of cycle rear suspension set forth above. Rather, it is to be taken as including all reasonable equivalents within the scope of the following claims.

I claim:

1. A rear suspension system for a cycle having a main frame including a seat tube and a downtube, said suspension system comprising:
   a one piece lug in which is integrally formed a tube for removably receiving a seat tube, a tube for removably receiving a down tube, a pedal shaft bearing housing, and a cylinder having slidably mounted therein a piston connected to a piston actuating rod, said cylinder also containing damping fluid;
   a swingarm pivotally connected at its front end to the main frame at a point spaced apart from said lug, said swingarm having means at its rear end for supporting a rear wheel for substantially vertical movement relative to the main frame; and
   connecting and guiding means connecting the swingarm to the piston actuating rod;
   whereby vertical load to the rear wheel is resisted to a,predetermined degree by motion of the piston through the damping fluid within the cylinder.

2. A rear suspension system according to claim 1 wherein the swingarm is part of a pivotable rear frame assembly attached at its front end to the main frame.

3. A rear suspension system according to claim 1 in which the cylinder of the lug has a longitudinal axis in line with a longitudinal axis of the downtube.

4. A rear suspension system according to claim 1 in which the cylinder of the lug has a longitudinal axis in line with a longitudinal axis of the seat tube.

5. A rear suspension system according to claim 1 further comprising biasing means positioned within said cylinder.

6. A rear suspension system according to claim 1 wherein said piston includes passages through which said damping fluid is forced when said piston moves within said cylinder, thereby providing damping of the movement of said piston with respect to said cylinder.

7. A rear suspension system for a cycle having a main frame including a seat tube and a downtube, said suspension system comprising:
   a one piece lug in which is integrally formed a tube for removably receiving a seat tube, a tube for removably receiving a down tube, a pedal shaft bearing housing, and a cylinder having slidably mounted therein a piston connected to a piston actuating rod, said cylinder also containing damping fluid;
   a pivotable rear frame assembly including an elongated primary swingarm pivotally connected at its front end to the main frame at a pivot connection spaced apart from said lug, and having means at its rear end for supporting a rear wheel for up and down movement relative to the main frame, said rear frame assembly also including an elongated, forwardly extending secondary swingarm having the rear end thereof connected to the rear end of the primary swingarm and pivotally movable therewith about the pivot connection at the main frame; and
   connecting and guiding means for connecting the forward end of the secondary swingarm to the piston actuating rod;
   whereby vertical load to the rear wheel is resisted to a predetermined degree by motion of the piston through the damping fluid within the cylinder.

8. A rear suspension system according to claim 7 in which the connecting and guiding means is capable of vertical and longitudinal movement to allow rotational motion of the forward end of the secondary swingarm about the swingarm pivot, said connecting and guiding means resisting lateral motion of said forward end of the secondary swingarm with respect to the main frame.

9. A rear suspension system according to claim 7 in which the cylinder of the lug has a longitudinal axis in line with a longitudinal axis of the downtube.

10. A rear suspension system according to claim 7 in which the cylinder of the lug has a longitudinal axis in line with a longitudinal axis of the seat tube.

11. A rear suspension system according to claim 7 further comprising biasing means positioned within said cylinder.

12. A rear suspension system according to claim 7 wherein said piston includes passages through which said fluid is forced when said piston slides within said cylinder, thereby providing damping of the sliding movement of said piston with respect to said cylinder.

* * * * *